US011342626B2

(12) United States Patent
Motohashi et al.

(10) Patent No.: US 11,342,626 B2

(45) Date of Patent: May 24, 2022

(54) BATTERY PACK

(71) Applicant: Marelli Corporation, Saitama (JP)

(72) Inventors: Toshiyuki Motohashi, Saitama (JP); Takayuki Hirase, Saitama (JP)

(73) Assignee: Marelli Corporation, Saitama (JP)

( * ) Notice: Subject to any disclaimer, the term of this patent is extended or adjusted under 35 U.S.C. 154(b) by 151 days.

(21) Appl. No.: 16/753,518

(22) PCT Filed: Oct. 1, 2018

(86) PCT No.: PCT/JP2018/036720

§ 371 (c)(1), (2) Date: Apr. 3, 2020

(87) PCT Pub. No.: WO2019/069862

PCT Pub. Date: Apr. 11, 2019

(65) Prior Publication Data

US 2020/0259157 A1 Aug. 13, 2020

(30) Foreign Application Priority Data

Oct. 3, 2017 (JP) ............................ JP2017-193812

(51) Int. Cl.

*H01M 50/227* (2021.01)
*H01M 50/20* (2021.01)

(Continued)

(52) U.S. Cl.

CPC ......... *H01M 50/227* (2021.01); *H01M 50/20* (2021.01); *H01M 50/211* (2021.01);

(Continued)

(58) Field of Classification Search

None

See application file for complete search history.

(56) References Cited

U.S. PATENT DOCUMENTS 9,269,934 B2 2/2016 Yang et al.
2007/0238018 A1 10/2007 Lee et al.

(Continued)

FOREIGN PATENT DOCUMENTS

JP 5154454 B2 2/2013
KR 20130076499 A 7/2013

(Continued)

OTHER PUBLICATIONS

Office Action of corresponding application JP2017-193812, dated Oct. 30, 2018; 3 pages.

(Continued)

*Primary Examiner* — Gregg Cantelmo

(74) *Attorney, Agent, or Firm* — Young Basile Hanlon & MacFarlane, P.C.

(57) ABSTRACT

A battery pack includes stacked battery cells housed between a first case and a second case. The battery cells each include an electrode tab protruding from a first outer surface. The first case and the second case are divided so as to sandwich the battery cells from a side surface of the electrode tab. The first case includes a housing portion configured to house at least a portion of the electrode tab and an abutting portion capable of abutting the side surface of the electrode tab of each battery cell when the electrode tab is inserted in the housing portion.

4 Claims, 13 Drawing Sheets

20 E1 25 22a 23 23 24 24 22c 25

Up Right Left Down

(51) Int. Cl.

| | |
|---|---|
| ***H01M 50/242*** | (2021.01) |
| ***H01M 50/296*** | (2021.01) |
| ***H01M 50/291*** | (2021.01) |
| ***H01M 50/211*** | (2021.01) |
| ***H01M 50/502*** | (2021.01) |
| ***H01M 50/516*** | (2021.01) |

(52) U.S. Cl.

CPC ....... *H01M 50/242* (2021.01); *H01M 50/291* (2021.01); *H01M 50/296* (2021.01); *H01M 50/502* (2021.01); *H01M 50/516* (2021.01); *H01M 2220/20* (2013.01)

(56) References Cited

U.S. PATENT DOCUMENTS

2013/0323549 A1* 12/2013 Choi .................. H01M 50/502 429/62

2016/0164051 A1* 6/2016 Cho ...................... H01M 50/20 429/121

2018/0151921 A1* 5/2018 Yun ....................... H01M 50/20

FOREIGN PATENT DOCUMENTS

KR 20150131788 A 11/2015

WO 2016067487 A1 5/2016

OTHER PUBLICATIONS

Office Action of corresponding application JP2017-193812; dated Jan. 22, 2019; 3 pages.

Office Action of corresponding application JP2019-097026; dated Feb. 4, 2020; 2 pages.

Office Action of corresponding application JP2019-097026; dated Oct. 1, 2019; 5 pages.

Office Action of corresponding application JP2017-193812, dated Jul. 16, 2019; 2 pages.

International Preliminary Report on Patentability dated Apr. 8, 2020 of International Application No. PCT/JP2018/036720.

* cited by examiner

BATTERY PACK

CROSS-REFERENCE TO RELATED APPLICATION

The present application is a 371 application of International Patent Application Serial No. PCT/JP2018/036720, which claims priority to and the benefit of Japanese Patent Application No. 2017-193812 filed Oct. 3, 2017, the entire contents of which are incorporated herein by reference.

TECHNICAL FIELD

The present disclosure relates to a battery pack.

BACKGROUND

A chargeable/dischargeable battery module that includes a plurality of battery cells is known. For example, patent literature JP5154454B2 discloses a battery module in which a plurality of battery cells are arranged inside an upper frame and lower frame that are joined together.

SUMMARY

In the battery module disclosed in JP5154454B2, however, the outer surface of the battery cell on which an electrode tab is formed differs from the outer surface of the battery cell for positioning the battery cell in the lower frame. If the electrode tabs of adjacent battery cells are welded after positioning the battery cells in the lower frame in this case, it might not be possible to secure sufficient accuracy for positioning the electrode tabs.

The present disclosure has been conceived from this perspective and aims to provide a battery pack capable of accurate positioning when electrode tabs of adjacent battery cells are welded together.

To resolve the aforementioned problem, a battery pack according to an embodiment of the present disclosure includes a stacked plurality of battery cells housed between a first case and a second case;

wherein the battery cells each include:

an electrode tab;

a first outer surface from which the electrode tab protrudes, the first outer surface facing a protruding direction of the electrode tab; and a third outer surface intersecting the first outer surface and facing a stacking direction of the battery cells;

wherein the third outer surface comprises two surfaces facing opposite directions;

wherein the electrode tab of one battery cell among the battery cells is laser welded outside the first case to the electrode tab of another adjacent battery cell among the battery cells;

wherein the first case and the second case are divided so as to sandwich the battery cells from a side surface of the electrode tab;

wherein the first case includes:

an insulating portion extending in the protruding direction of the electrode tab from a location facing a portion of the electrode tab to a location facing an edge of the third surface, disposed between the electrode tabs of the stacked plurality of battery cells, and configured to insulate adjacent electrode tabs in the housing portion;

a guide protruding from the insulating portion in the stacking direction of the battery cells, the guide comprising a tapered portion that tapers towards an opposite side from an insertion direction of the electrode tab; and an abutting portion configured to abut against the electrode tab and restrict movement of the electrode tab in the insertion direction of the electrode tab while the electrode tab is inserted in the guide;

wherein guides protruding from adjacent insulating portions comprise:

a portion protruding towards both surfaces of the electrode tab and configured to guide the both surfaces when the electrode tab is housed; and a portion protruding towards edges of the two surfaces of the third outer surface at a same side in the protruding direction of the electrode tab and configured to guide the edges when the electrode tab is housed; and wherein the portion protruding towards both surfaces of the electrode tab and configured to guide the both surfaces when the electrode tab is housed is separated from the portion protruding towards edges of the two surfaces of the third outer surface at the same side in the protruding direction of the electrode tab and configured to guide the edges when the electrode tab is housed.

A battery pack according to an embodiment of the present disclosure can position electrode tabs inside a case.

DETAILED DESCRIPTION

Embodiments of the present disclosure are described below with reference to the attached drawings. The front-back, left-right, and up-down directions in the description below take the directions of the arrows in the figures as a reference. The stacking direction of the plurality of battery cells 10 in the example below is the up-down direction, but this example is not limiting. The stacking direction of the plurality of battery cells 10 may match any other direction.

First Embodiment

Figure 1:
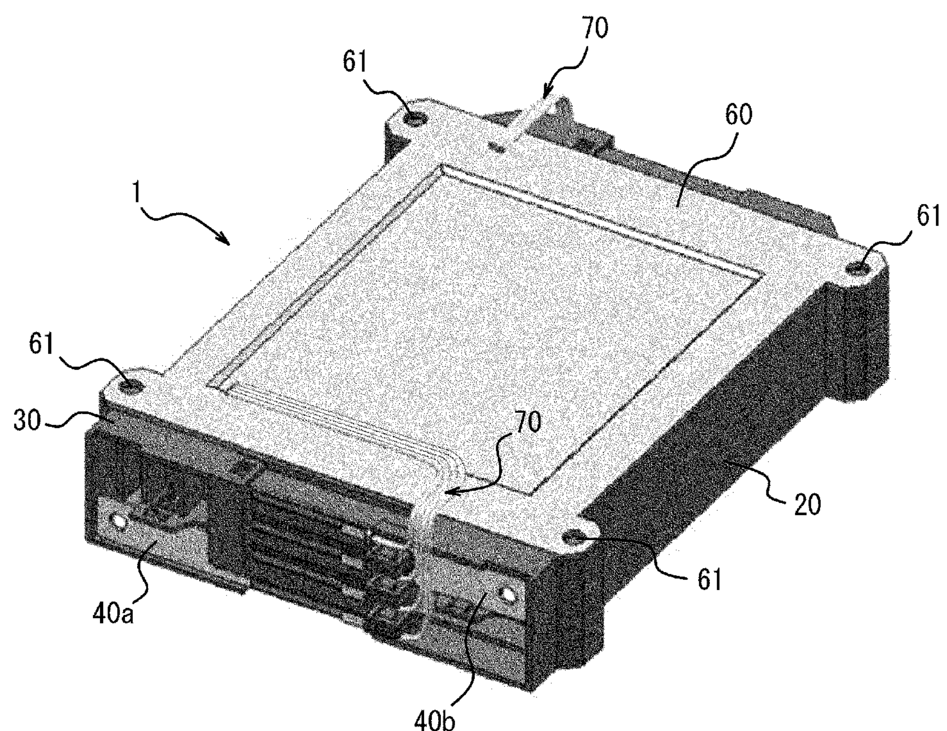
FIG. 1 is a perspective view from the top illustrating the appearance of a battery pack according to a first embodiment of the present disclosure.
Figure 1:
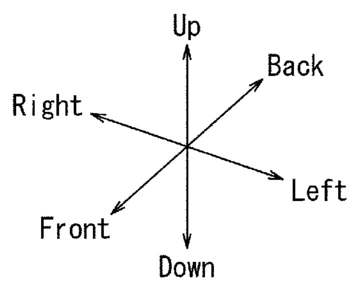
Figure 2:
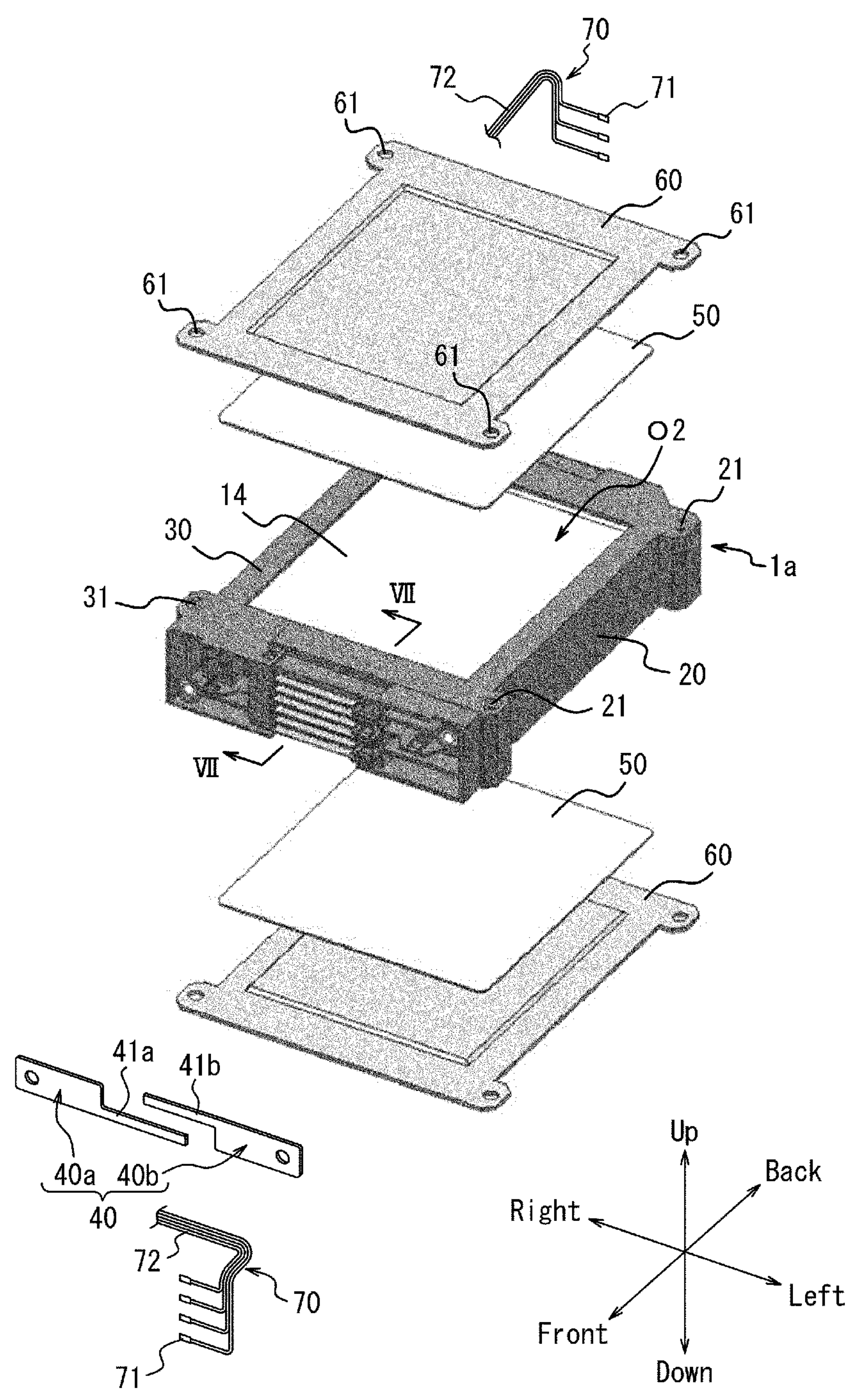
FIG. 2 is an exploded perspective view from the top illustrating a portion of the battery pack in FIG. 1.
Figure 3:
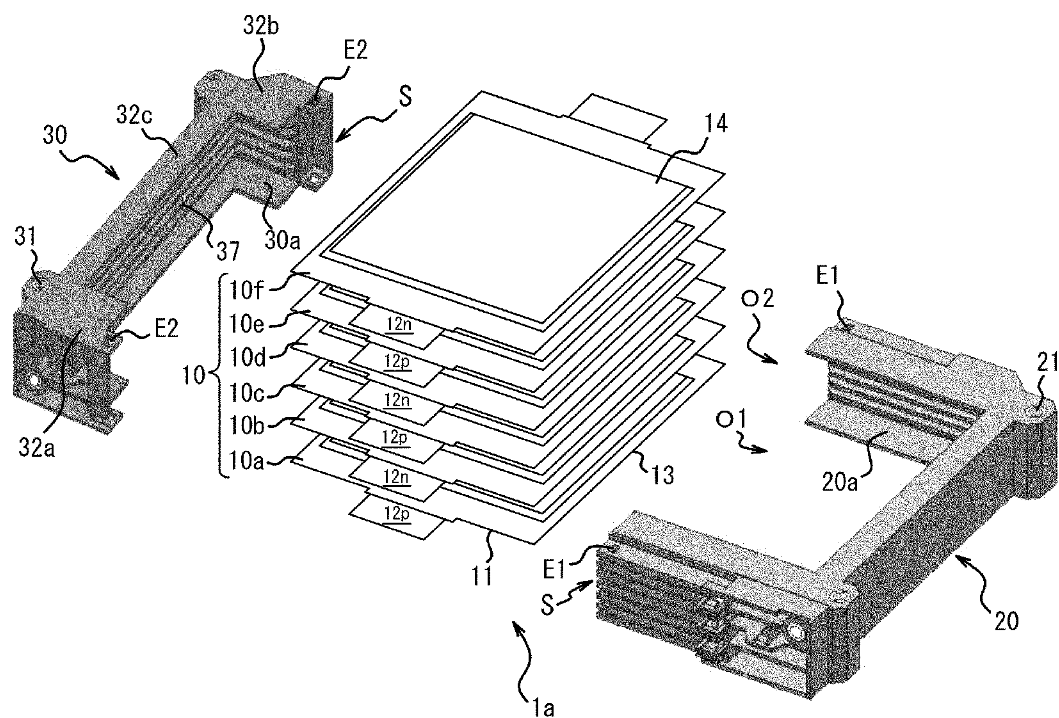
FIG. 3 is an exploded perspective view of each component of the body of the battery pack in FIG. 2.
Figure 3:
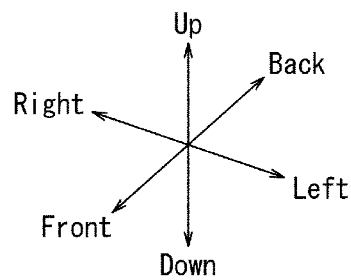

FIG. 1 is a perspective view from the top illustrating the appearance of a battery pack 1 according to a first embodiment of the present disclosure. FIG. 2 is an exploded perspective view from the top illustrating a portion of the battery pack 1 in FIG. 1. FIG. 3 is an exploded perspective view of each component of the body 1*a* of the battery pack 1 in FIG. 2. The battery pack 1 includes the body 1*a*, a bus bar 40, insulating sheets 50, restraining plates 60, and a voltage detector 70 as major constituent elements. The body 1*a* includes six battery cells 10, a first case 20, and a second case 30.

As illustrated in FIG. 3, the six battery cells 10 are stacked in the up-down direction. The six stacked battery cells 10 are referred to below as the battery cells 10*a*, 10*b*, 10*c*, 10*d*, 10*e*, 10*f* in order from bottom to top. The battery cells are referred to collectively as battery cells 10 when no distinction therebetween is made. Each battery cell 10 has two first outer surfaces 11 formed by a front surface and a back surface that are substantially parallel in the up-down direction. Each battery cell 10 has one pair of electrode tabs 12*p* and 12*n* that protrude in opposite directions from the two first outer surfaces 11 in a direction substantially perpendicular to the stacking direction, in particular in the front-back direction. Each battery cell 10 is stacked with the pair of electrode tabs 12*p* and 12*n* aligned in the front-back direction.

The battery cell 10 has two second outer surfaces 13 formed by two side surfaces in the left-right direction that intersect the first outer surfaces 11. The battery cell 10 has two third outer surfaces 14 that intersect the first outer surfaces 11 and the second outer surfaces 13. The two third outer surfaces 14 are formed by the upper surface and lower surface of the battery cell 10 and intersect an axis extending in the stacking direction, i.e. the vertical axis.

The first case 20 and the second case 30 may be made of any highly rigid material, such as a resin material or a metal material provided with an electrically insulating material, such as PET resin, on the surface thereof.

The first case 20 and the second case 30 are each substantially C-shaped. The stacked plurality of battery cells 10 are housed between the first case 20 and the second case 30. The first case 20 and the second case 30 are divided so as to sandwich the battery cells 10 from the side surfaces of the electrode tabs 12*p* and 12*n*. In greater detail, the first case 20 and the second case 30 are divided in the protruding direction of the electrode tabs 12*p* and 12*n*, i.e. the front-back direction. The first case 20 and the second case 30 engage with each other to cover the first outer surfaces 11 of the battery cells 10 and support the stacked battery cells 10 therein. The stacked battery cells 10 are mounted on a bottom surface 20*a* of the first case 20 and a bottom surface 30*a* of the second case 30. When the first case 20 and the second case 30 are engaged, the first case 20 has an opening O1 formed on the bottom surface, and the second case 30 has an opening O2 formed on the top surface. Connection surfaces S of the first case 20 and the second case 30 are substantially perpendicular to the first outer surfaces 11 of the battery cells 10 and are substantially parallel to the protruding direction of the electrode tabs 12*p* and 12*n*, i.e. the front-back direction. The connection surfaces S are substantially parallel to the up-down direction. In this way, the first case 20 and the second case 30 are engaged or separated in the left-right direction.

The first case 20 and the second case 30 may be engaged by engaging claws E1 formed on both the front and back sides of the upper and lower surfaces of one case and engaging holes E2 formed on both the front and back sides of the corresponding upper and lower surfaces of the other case. The engaging claws E1 engage with the engaging holes E2 when the first case 20 and the second case 30 are engaged. The battery pack 1 is not limited to a configuration engaged by claws and holes. For example, the first case 20 and the second case 30 may be engaged by arbitrary protrusions, which protrude from the respective upper and lower surfaces, being clamped by an elastic member, such as a clip. The first case 20 and the second case 30 may be engaged by any fastening structure, such as screwing. In this way, the battery pack 1 may have any engaging structure that allows the first case 20 and the second case 30 to be engaged reliably. The battery pack 1 is therefore easy to assemble, which can contribute to improving product reliability.

As illustrated in FIG. 2, the bus bar 40 has a total plus bus bar 40*a* and a total minus bus bar 40*b*. The bus bar 40 is formed in the shape illustrated in FIG. 2 by a metal such as aluminum or copper. The total plus bus bar 40*a* is connected to the electrode tab 12*p* of the battery cell 10*a*. The total minus bus bar 40*b* is connected to the electrode tab 12*n* of the battery cell 10*f*.

The insulating sheets 50 are formed as a substantially flat plate by an electrically insulating material such as polyethylene (PE) or polypropylene (PP) resin. One insulating sheet 50 is disposed to abut against the upper surface of the battery cell 10*f* positioned at the top of the stacked battery cells 10. Similarly, another insulating sheet 50 is disposed to abut against the lower surface of the battery cell 10*a* positioned at the bottom of the stacked battery cells 10. The insulating sheets 50 are provided to secure electrical insulation between the restraining plates 60 fixed to the upper and lower surfaces of the battery pack 1 and the battery cells 10 inside the battery pack 1.

The restraining plates 60 are made of any highly rigid material. For example, the restraining plates 60 may be made exclusively of a metal material. This example is not limiting, and the restraining plates 60 may be made of a resin material or a metal material provided with an electrically insulating material, such as PET resin, on the surface thereof. The restraining plates 60 are formed as a substantially flat plate.

The restraining plates 60 are disposed to abut against the upper and lower surfaces of the insulating sheet 50 at the upper and lower surfaces of the battery pack 1. The restraining plates 60 are fixed to the upper and lower surfaces of the engaged first case 20 and second case 30 by a suitable method, such as screwing. For example, screws may be inserted into holes 61 that are provided at the four corners of the restraining plate 60 and aligned with two screw holes 21 provided at both front and back edges on the side surface of the first case 20 and two screw holes 31 provided at both front and back edges on the side surface of the second case 30. The restraining plates 60 are thereby fixed to the upper and lower surfaces of the engaged first case 20 and second case 30. The restraining plates 60 clamp the battery cells 10 between the first case 20 and the second case 30 in a state that restrains the two third outer surfaces 14 that are formed by the upper and lower surfaces of the battery cells 10 and that intersect the axis extending in the stacking direction. At the same time, the restraining plates 60 support the battery cells 10.

The voltage detector 70 is formed by a terminal plate 71 for detecting the voltage of the battery cell 10 and a wire 72 for transmitting the detected voltage signal. The voltage detector 70 is connected to the corresponding electrode tab of the battery cell 10.

Figure 4A:
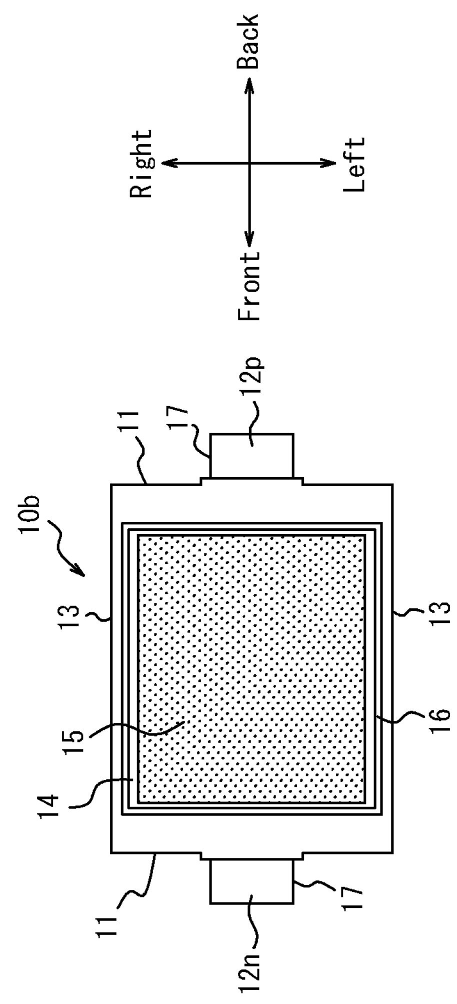
FIG. 4A is a top view of a battery cell.
Figure 4B:
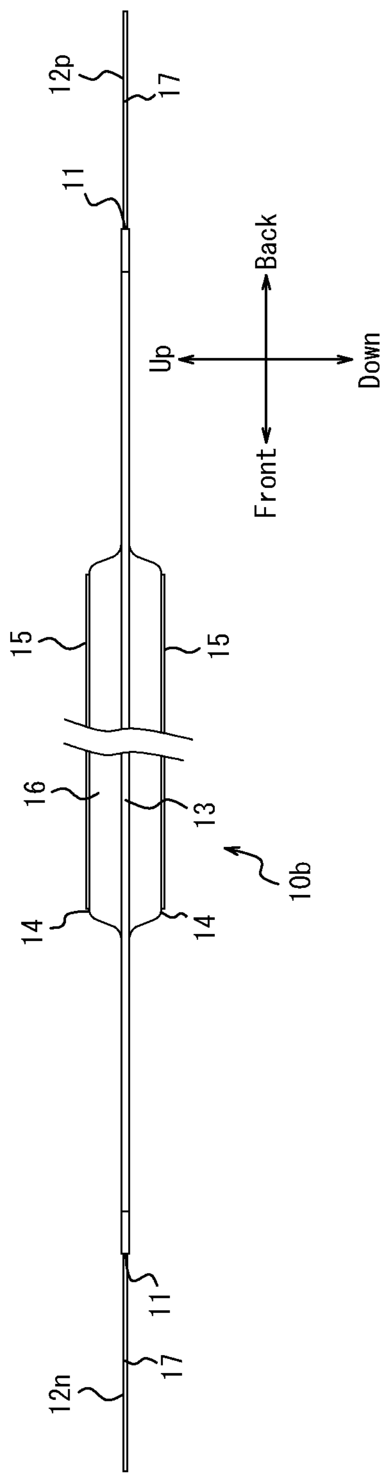
FIG. 4B is a side view of a battery cell.

FIGS. 4A and 4B illustrate only the battery cell 10 of FIG. 3. FIG. 4A is a top view of the battery cell 10. FIG. 4B is a side view of the battery cell 10. As an example, FIGS. 4A and 4B illustrate the battery cell 10*b* disposed as in FIG. 3. The other battery cells 10 are also configured similarly to the battery cell 10*b* illustrated in FIGS. 4A and 4B.

The battery cell 10 is formed as a substantially flat plate when viewed from the top. An exterior member 16 of the battery cell 10 is formed by a laminated film. The outermost layer of the exterior member 16 is made of resin to secure electrical insulation. The upper and lower surfaces of the exterior member 16 form the third outer surfaces 14. The first outer surfaces 11 protrude one step farther outward in the central region than at the left and right edges. The first outer surfaces 11 are formed to be convex when viewed from the top. The electrode tab 12*p* or 12*n* protrudes from the portion of the first outer surface 11 that protrudes one step outward. The electrode tabs 12*p* and 12*n* protrude substantially in parallel with the front-back direction and have side surfaces 17 along the protruding direction. The electrode tabs 12*p* and 12*n* normally protrude as flat plates, as illustrated in FIGS. 4A and 4B. During the below-described assembly process of the battery pack 1, however, the electrode tabs 12*p* and 12*n* are symmetrically bent towards the outside to be substantially L-shaped, when viewed from the side, in order to contact the electrode tab 12*p* or 12*n* of another battery cell 10 adjacent in the up-down direction or the bus bar 40. For example, the electrode tab 12*p* protrudes linearly outward along the front-back direction and then bends downwards. The electrode tab 12*n* protrudes linearly outward along the front-back direction and then bends upwards. In the example below, the electrode tab 12*p* bent downwards is a positive electrode terminal, and the electrode tab 12*n* bent upwards is a negative electrode terminal, but this example is not limiting. The electrode tabs 12*p* and 12*n* may be configured so that the positive electrode and negative electrode roles are reversed.

The battery cell 10 may include an adhesive layer 15 provided on the two third outer surfaces 14 to adhere adjacent battery cells 10 to each other. The adhesive layer 15 may be provided on just one of the upper and lower two third outer surfaces 14. The adhesive layer 15 may be made of an adhesive such as a bonding agent or double-sided tape. For example, adjacent battery cells 10 may be adhesively fixed to each other by any method, such as applying a bonding agent to the upper surface and lower surface of each battery cell 10. Similarly, the battery cells 10 and the insulating sheets 50 may be adhesively fixed to each other by adhesive. The insulating sheets 50 and restraining plates 60 may also similarly be adhesively fixed to each other by adhesive.

Figure 5A:
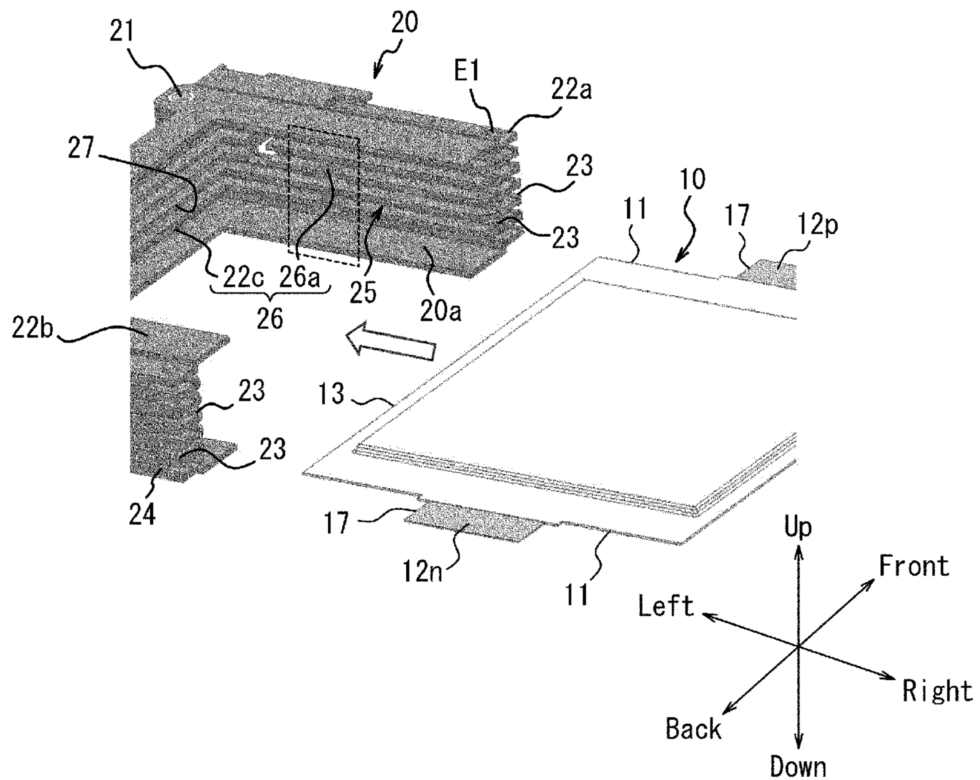
FIG. 5A is an overall view illustrating insertion of a battery cell into the first case of FIG. 3.
Figure 5B:
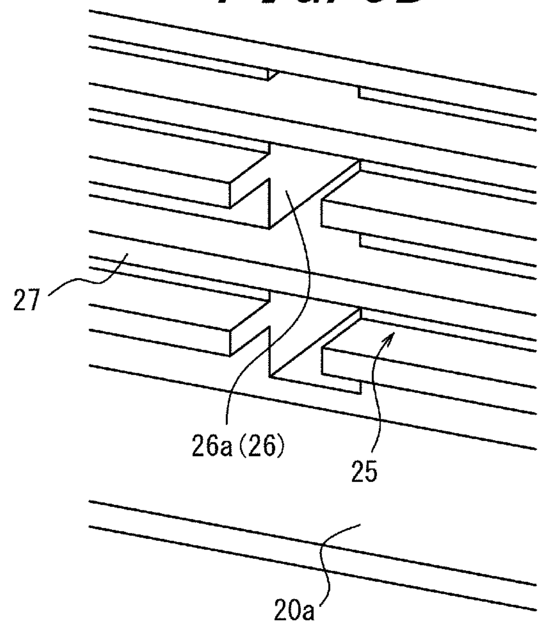
FIG. 5B illustrates an enlargement of the portion surrounded by a dashed line in FIG. 5A.
Figure 6:
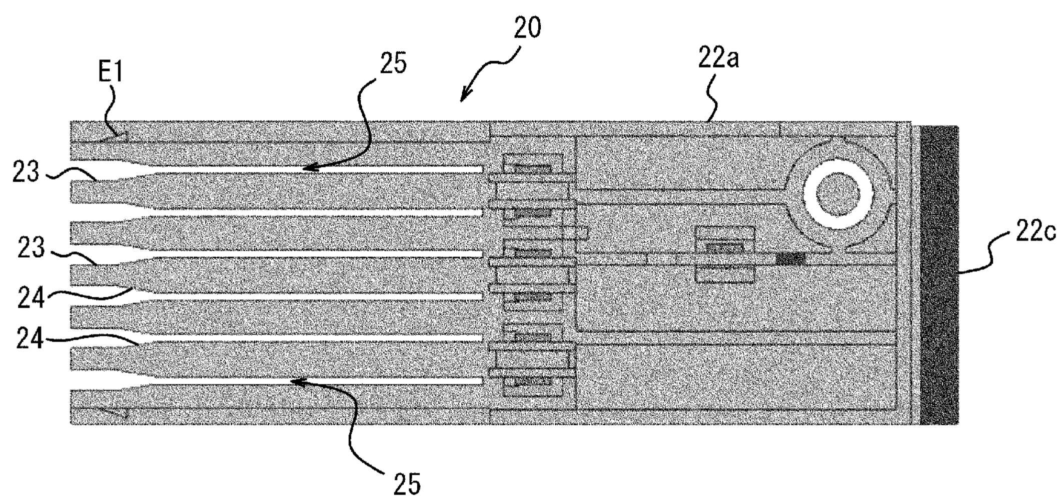
FIG. 6 is a front view of the first case of FIG. 3.
Figure 6:
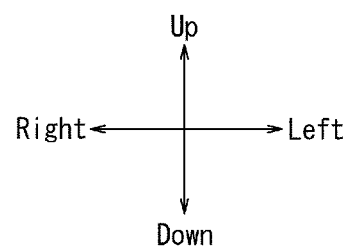
Figure 7:
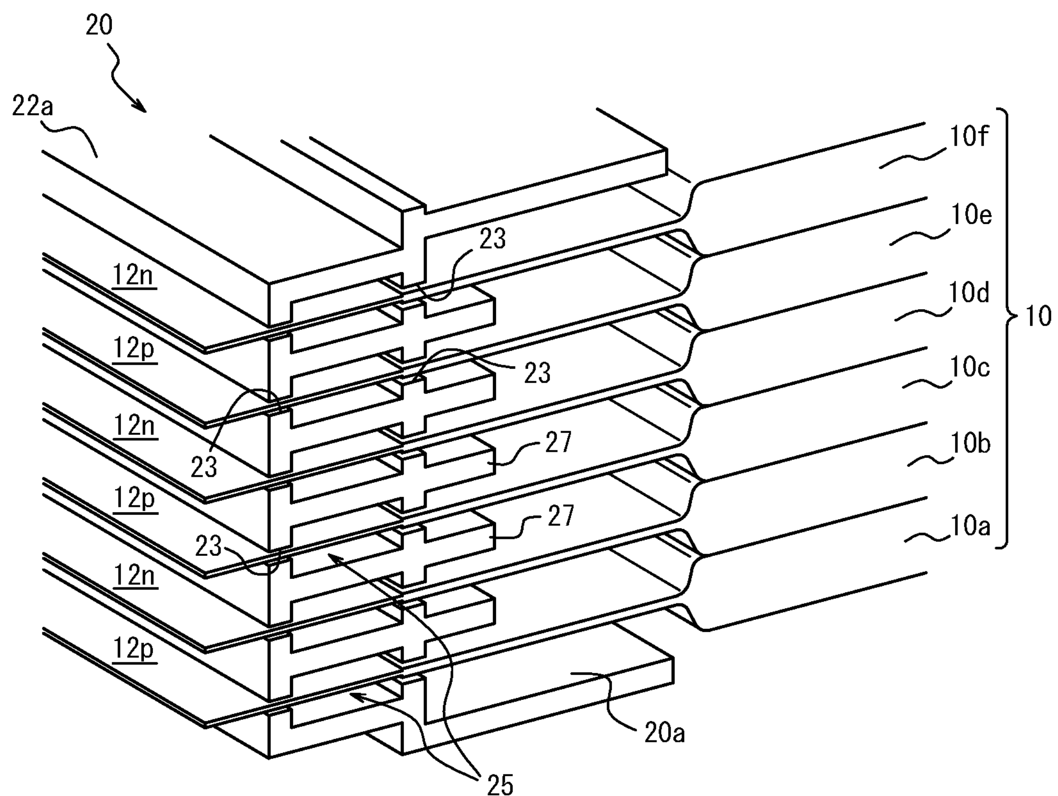
FIG. 7 is a cross-sectional view along the VII-VII line of FIG. 2.

FIGS. 5A and 5B illustrate insertion of the battery cell 10 into the first case 20 of FIG. 3. FIG. 5A illustrates the overall state. FIG. 5B illustrates an enlargement of the portion surrounded by a dashed line in FIG. 5A. FIG. 6 is a front view of the first case 20 of FIG. 3. FIG. 7 is a cross-sectional view along the VII-VII line of FIG. 2.

Guides 23 extending in the left-right direction are lined up in the up-down direction on a front wall 22*a* and a back wall 22*b* of the first case 20. The guides 23 are provided on both the upper and lower surfaces of first insulating portions 27, described below (see FIG. 7). The guides 23 are formed as protrusions protruding from the surfaces of the first insulating portions 27 in the up and down directions. The guides 23 guide the electrode tabs 12*p* and 12*n* towards a side wall 22*c* of the first case 20, which is faced by the second outer surface 13 when the battery cell 10 is inserted. The guides 23 include tapered portions 24 that are tapered towards the opposite side from the insertion direction of the electrode tabs 12*p* and 12*n* (see FIG. 6). The tapered portions 24 are continuous with a portion of the guide 23 where the guide 23, which extends in the left-right direction, widens. The tapered shape of the tapered portion 24 may, for example, be linear or be a gradual curve. Consequently, the separation width of each guide 23 in the up-down direction gradually decreases towards the side wall 22*c*. This configuration of the tapered portion 24 enables the battery pack 1 to further improve the ease of insertion of the battery cells 10 into the first case 20.

Narrow housing portions 25 continuous with the tapered portion 24 of the guide 23 are formed in the left-right direction at the back side of the front wall 22*a* and the back wall 22*b* of the first case 20, where the battery cells 10 are inserted. The housing portions 25 are internal spaces formed at the back side of the front surface and back surface of the first case 20 and house at least a portion of the electrode tabs 12*p* and 12*n* (see FIG. 7) once the battery cells 10 have been inserted in the first case 20.

For example, when the battery cells 10 are inserted into the first case 20, the electrode tabs 12*p* and 12*n* first traverse the wide entrance portion of the guides 23. Next, the electrode tabs 12*p* and 12*n* abut against the surface of the tapered portions 24 of the guides 23, for example, and slide along this surface. The electrode tabs 12*p* and 12*n* are thus guided into the narrow housing portions 25 by the tapered portions 24.

The first case 20 includes an abutting portion 26 capable of abutting the electrode tab 12*p* or 12*n* of each battery cell 10 against the side surface 17 when the electrode tabs 12*p* and 12*n* of the battery cells 10 are inserted in the housing portions 25. In greater detail, the abutting portion 26 is configured by an inner wall 26*a*, of the first case 20, faced by the side surface 17 along the protruding direction of the electrode tab 12*p* or 12*n* when the battery cells 10 are inserted in the first case 20 (see FIG. 5B). The inner wall 26*a* is configured by the end face at the back of the housing portion 25 of the first case 20. In this case, the side surface 17 of the battery cell 10 abuts against the abutting portion 26 of the first case 20, i.e. the inner wall 26*a*, upon the battery cell 10 being inserted in the first case 20.

The abutting portion 26 may further abut against the second outer surface 13 of the battery cell 10 when the battery cell 10 is inserted in the first case 20. In greater detail, the abutting portion 26 may be configured by the side wall 22*c* faced by the second outer surface 13 when the battery cell 10 is inserted (see FIG. 5A). In this case, the second outer surface 13 of the battery cell 10 abuts against the abutting portion 26 of the first case 20, in particular the side wall 22*c*, upon the battery cell 10 being inserted in the first case 20.

In this way, each battery cell 10 is positioned in the left-right direction by the corresponding portion being abutted against the abutting portion 26 of the first case 20, using the electrode tab 12*p* or 12*n* as a reference. The abutting portion 26 forms a portion of the housing portion 25, where the electrode tab 12*p* or 12*n* is housed, in the first case 20. By the abutting portion 26 abutting against the side surface 17 of the electrode tab 12*p* or 12*n*, the battery pack 1 allows accurate positioning, in the left-right direction, of the electrode tabs 12*p* and 12*n* of adjacent battery cells 10 when these tabs are welded together. Each battery cell 10 may be positioned in the left-right direction using at least one side surface 17 of the electrode tabs 12*p* and 12*n* as a reference.

On the other hand, each battery cell 10 may be positioned in the front-back direction by, for example, a corresponding portion of the first outer surface 11 abutting against the front wall 22*a* or back wall 22*b* of the first case 20. The position of each battery cell 10 in the front-back direction may be determined by the portion of the first outer surface 11 on the side wall 22*c* side abutting against the portion of the front wall 22*a* or back wall 22*b* of the first case 20 where the housing portion 25 is not formed.

The first case 20 comprises first insulating portions 27 that are formed continuously across the inner surface of the front wall 22*a*, the back wall 22*b*, and the side wall 22*c*. The first insulating portions 27 insulate adjacent battery cells 10 from each other when the battery cells 10 are stacked. In particular, the first insulating portions 27 electrically insulate electrode tabs 12*p* and 12*n* adjacent in the stacking direction of the battery cells 10 from each other in the housing portions 25. A total of five first insulating portions 27 are provided, one between each of the six stacked battery cells 10.

The second case 30 that engages with the first case 20 is configured to have a shape corresponding to the first case 20, as illustrated in FIG. 3. The second case 30 may include second insulating portions 37 like the first case 20. Like the first insulating portions 27, the second insulating portions 37 may be formed continuously across the inner surface of a front wall 32*a*, a back wall 32*b*, and a side wall 32*c* of the second case 30. This example is not limiting, and the second insulating portion 37 may be formed on the inner surface of at least one of the front wall 32*a*, the back wall 32*b*, and the side wall 32*c*. The second case 30 may include guides and tapered portions configured similarly to the first case 20.

Figure 8A:
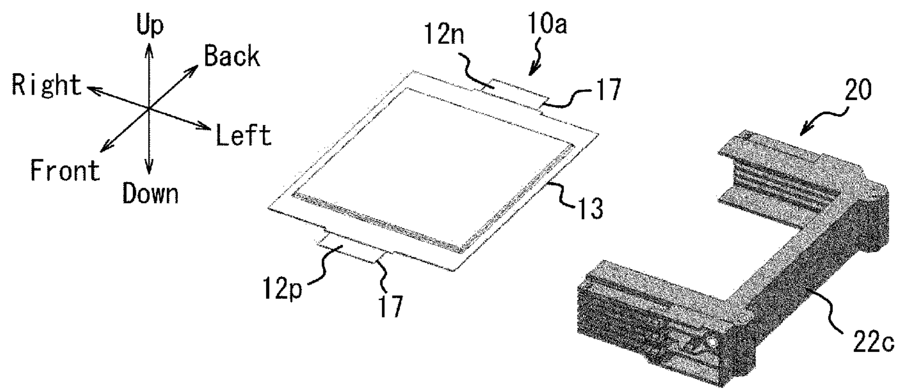
FIG. 8A is a schematic diagram illustrating a representative first step for assembling the body of the battery pack illustrated in FIG. 1.
Figure 8B:
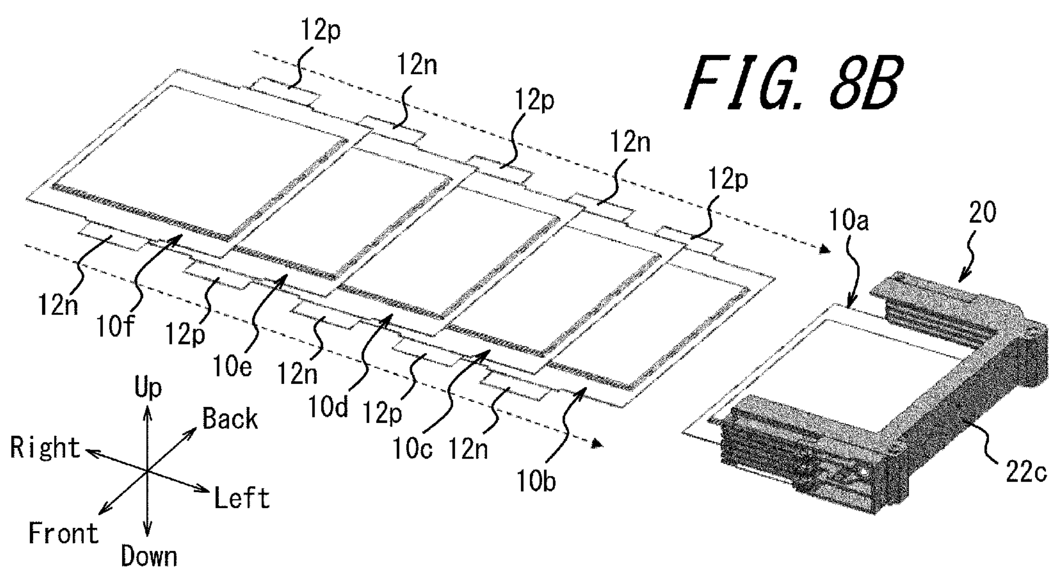
FIG. 8B is a schematic diagram illustrating a representative second step for assembling the body of the battery pack illustrated in FIG. 1.
Figure 8C:
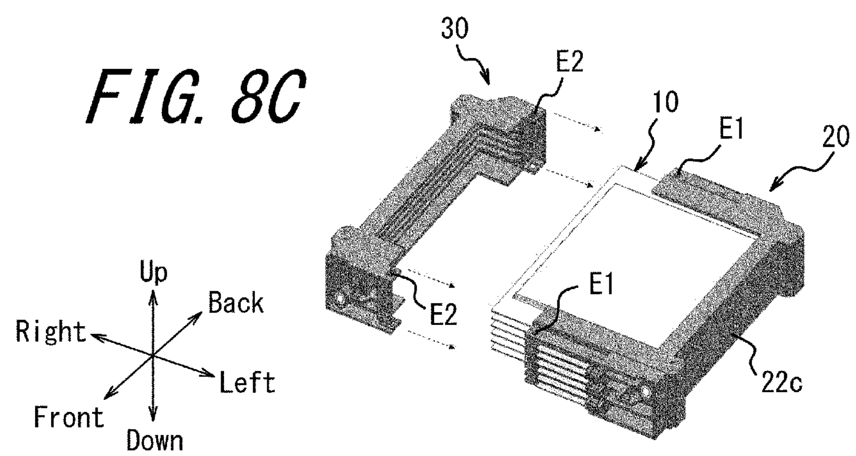
FIG. 8C is a schematic diagram illustrating a representative third step for assembling the body of the battery pack illustrated in FIG. 1.

FIGS. 8A through 8C are schematic diagrams illustrating the steps for assembling the body 1*a* of the battery pack 1 illustrated in FIG. 1. FIGS. 8A through 8C are schematic diagrams respectively illustrating representative first through third steps for assembling the body 1*a* of the battery pack 1.

In the first step illustrated in FIG. 8A, the battery cell 10*a* to be housed at the bottommost layer among the six stacked battery cells 10 is inserted in the first case 20. For example, the electrode tab 12*p* of the battery cell 10*a* is arranged at the front, and the electrode tab 12*n* is arranged at the back. Upon the battery cell 10*a* being inserted into the first case 20, the side surfaces 17 of the electrode tabs 12*p* and 12*n* of the battery cell 10*a* abut against the inner wall 26*a* of the first case 20. Similarly, the second outer surface 13 of the battery cell 10*a* may abut against the side wall 22*c* of the first case 20.

In the second step illustrated in FIG. 8B, the battery cells 10*b* through 10*f* are inserted into the first case 20 one at a time in order from the bottom. At this time, each battery cell 10 is arranged so that the electrode tabs 12*p* and 12*n* face the opposite directions from those of the adjacent battery cell 10. The battery cell 10*b* is arranged so that the electrode tab 12*p* faces backward and the electrode tab 12*n* faces forward. By repetition of a similar arrangement, the battery cell 10*f* positioned in the uppermost layer is arranged so that the electrode tab 12*p* faces backward and the electrode tab 12*n* faces forward. The battery cells 10*b* through 10*f* are positioned by abutting against the corresponding portions of the first case 20, like the battery cell 10*a*.

In the third step illustrated in FIG. 8C, the second case 30 is engaged with the first case 20 so as to cover the opposite side of the battery cell 10 from the side inserted into the first case 20. In greater detail, the first case 20 and the second case 30 are engaged by the engaging claws E1 provided on the upper and lower surfaces of the first case 20 being engaged with the engaging holes E2 provided on the upper and lower surfaces of the second case 30.

Figure 9:
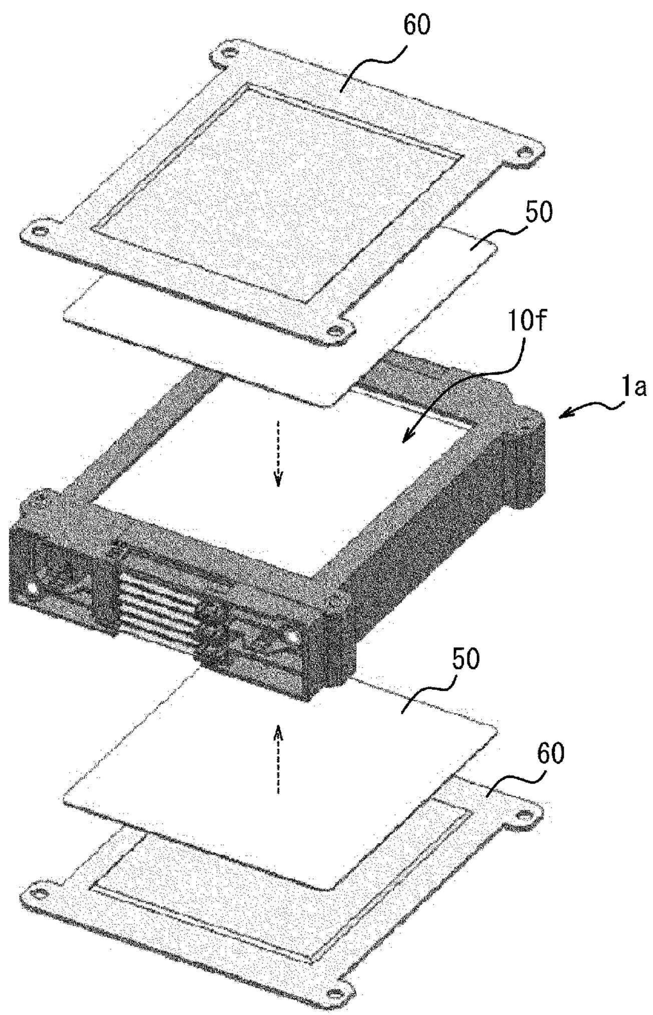
FIG. 9 is a schematic diagram illustrating a fourth step for attaching insulating sheets and restraining plates to the body of the battery pack illustrated in FIG. 1.
Figure 9:
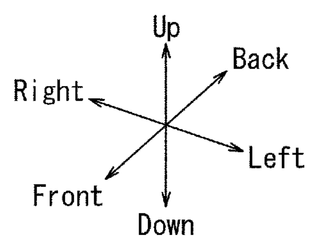

FIG. 9 is a schematic diagram illustrating the fourth step for attaching the insulating sheets 50 and the restraining plates 60 to the body 1*a* of the battery pack 1 illustrated in FIG. 1.

The insulating sheets 50 and restraining plates 60 are attached to the body 1*a* after assembly of the body 1*a* is complete. In particular, the insulating sheets 50 and restraining plates 60 are attached to both the upper and lower surfaces of the body 1*a*. In greater detail, two insulating sheets 50 are attached, one to abut against the upper surface of the battery cell 10*f* and another to abut against the lower surface of the battery cell 10*a*. Two restraining plates 60 are attached, one to abut against the upper surface and the other to abut against the lower surface of the insulating sheets 50 disposed on the top and bottom.

Figure 10:
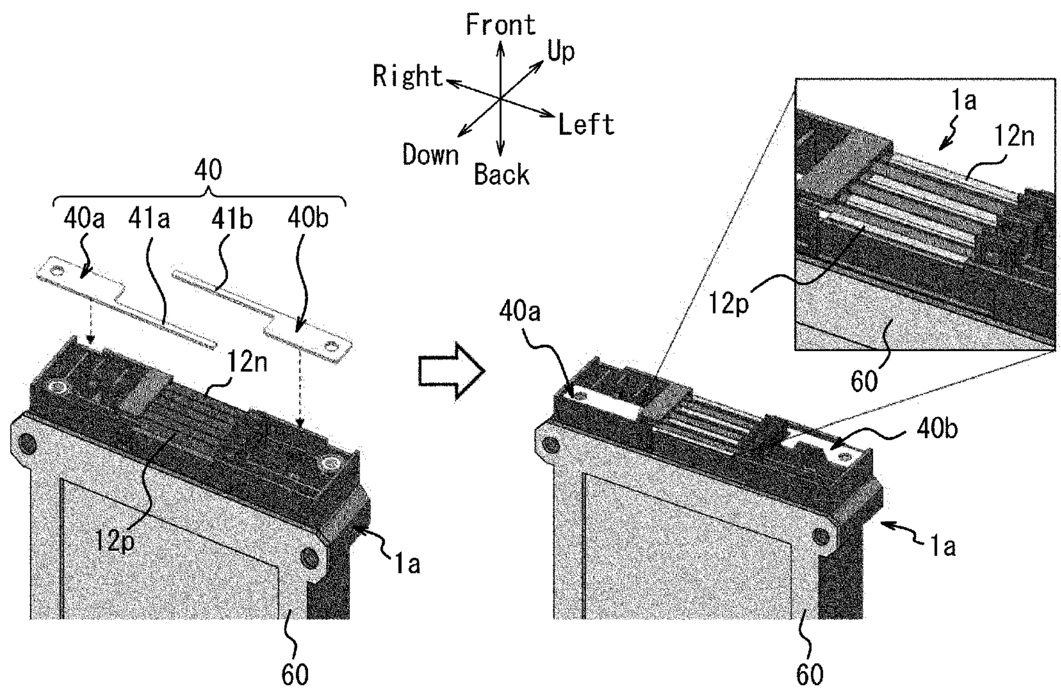
FIG. 10 is a schematic diagram illustrating a fifth step for attaching bus bars to the body of the battery pack illustrated in FIG. 1.

FIG. 10 is a schematic diagram illustrating the fifth step for attaching the bus bar 40 to the body 1*a* of the battery pack 1 illustrated in FIG. 1.

After the aforementioned fourth step is complete, the bus bar 40 is attached to the front surface of the body 1*a*. In greater detail, the position of the total plus bus bar 40*a* at the front surface of the body 1*a* is adjusted so that an insertion portion 41*a* of the total plus bus bar 40*a* is positioned directly below the electrode tab 12*p* of the battery cell 10*a* located at the bottommost layer. Similarly, the position of the total minus bus bar 40*b* at the front side of the body 1*a* is adjusted so that an insertion portion 41*b* of the total minus bus bar 40*b* is positioned directly above the electrode tab 12*n* of the battery cell 10*f* located at the uppermost layer. Subsequently, the electrode tabs 12*p* and 12*n* protruding substantially in the left-right direction are bent in a predetermined direction. For example, the electrode tabs 12*p* are bent downwards, and the electrode tabs 12*n* are bent upwards.

Figure 11:
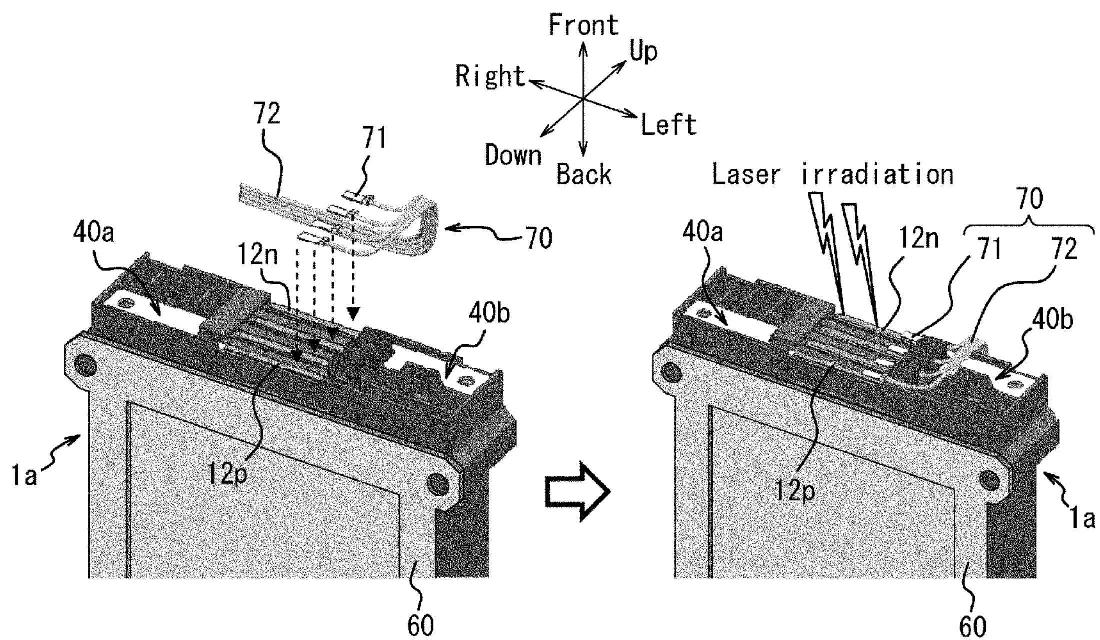
FIG. 11 is a schematic diagram illustrating a sixth step for attaching a voltage detector to the body of the battery pack illustrated in FIG. 1.

FIG. 11 is a schematic diagram illustrating the sixth step for attaching the voltage detector 70 to the body 1*a* of the battery pack 1 illustrated in FIG. 1.

After the aforementioned fifth step is complete, the voltage detector 70 is attached to the front surface of the body 1*a*. In greater detail, the terminal plate 71 is superimposed from the front onto the bent electrode tabs 12*p* and 12*n* that overlap each other and the bus bars 40 that overlap the bent electrode tab 12*p* or 12*n*. In this state, the constituent elements arranged at the front surface of the body 1*a* of the battery pack 1 are welded together by an appropriate method such as laser welding. The electrode tabs are welded to each other, as are the electrode tabs and bus bars 40, and the electrode tab and terminal plate 71. The same is true for the constituent elements disposed on the back surface of the body 1*a* of the battery pack 1. At this time, the electrode tabs of adjacent battery cells 10 are welded on the outside of the first case 20 and the second case 30.

This completes the assembly of the battery pack 1 illustrated in FIG. 1. In this case, the insertion portion 41*a* of the total plus bus bar 40*a* and the electrode tab 12*p* of the battery cell 10*a* are electrically connected at the front surface of the body 1*a*. Similarly, the electrode tab 12*n* of the battery cell 10*b* and the electrode tab 12*p* of the battery cell 10*c* are electrically connected. The electrode tab 12*n* of the battery cell 10*d* and the electrode tab 12*p* of the battery cell 10*e* are electrically connected. The insertion portion 41*b* of the total minus bus bar 40*b* and the electrode tab 12*n* of the battery cell 10*f* are electrically connected.

At the back surface of the body 1*a*, the electrode tab 12*n* of the battery cell 10*a* and the electrode tab 12*p* of the battery cell 10*b* are electrically connected. Similarly, the electrode tab 12*n* of the battery cell 10*c* and the electrode tab 12*p* of the battery cell 10*d* are electrically connected. The electrode tab 12*n* of the battery cell 10*e* and the electrode tab 12*p* of the battery cell 10*f* are electrically connected.

By thus being bent in vertically opposite directions, the electrode tabs 12*p* and 12*n* of each battery cell 10 are each connected to the electrode tab of opposite polarity of the adjacent battery cell 10. Ultimately, the six battery cells 10 are connected in series.

The battery pack 1 according to the first embodiment enables accurate positioning when the electrode tabs 12*p* and 12*n* of adjacent battery cells 10 are welded together. The side surface 17 of the electrode tabs 12*p* and 12*n* becomes the reference for positioning. The electrode tabs 12*p* and 12*n* of adjacent battery cells 10 can therefore be welded together after being accurately positioned. In this way, the battery pack 1 enables the electrode tabs 12*p* and 12*n* to be positioned more accurately at the time of welding than when the reference for positioning and the portion to be welded are disposed on outer surfaces in different directions of the battery cell.

In particular, the abutting portion 26 is the inner wall 26*a* of the first case 20 in the battery pack 1. This enables the entire side surface 17 of the electrode tab 12*p* or 12*n* that becomes the reference for positioning to be received and the battery cell 10 to be stably arranged. The positioning accuracy of the electrode tabs 12*p* and 12*n* is thereby further increased at the time of welding. The battery pack 1 can thus simplify the welding process of the electrode tabs 12*p* and 12*n* and facilitate welding operations. Consequently, the battery pack 1 can contribute to improving product reliability.

The battery pack 1 can further improve the positioning accuracy of the electrode tabs 12*p* and 12*n* by the abutting portion 26 further abutting against the second outer surfaces 13 of the battery cell 10. In particular, the battery pack 1 allows more accurate positioning in the insertion direction of the battery cell 10, i.e. the left-right direction.

The battery pack 1 can, in particular, further improve positioning accuracy of the electrode tabs 12*p* and 12*n* by the abutting portion 26 being configured by the side wall 22*c* of the first case 20. When the battery cells 10 are inserted, the battery pack 1 allows the second outer surface 13 to be reliably abutted against the side wall 22*c*, which is a part of the abutting portion 26. In particular, substantially the entire region of the second outer surfaces 13 in the front-back direction of the battery cell 10 abut against the side wall 22*c*. The battery pack 1 can thereby provide a reference for positioning over a wide region. Consequently, the battery pack 1 can reliably align the positions of the electrode tabs 12*p* and 12*n* across different battery cells 10 if the dimensions of each battery cell 10 are the same.

Only the first case 20 in the battery pack 1 includes the housing portions 25 that house pairs of electrode tabs 12*p* and 12*n*. The housing portions 25 can thereby be concentrated in one of the cases, improving production efficiency. The housing portions 25 can be formed collectively in the first case 20 of the battery pack 1. This enables a reduction in the number of manufacturing steps and contributes to improving productivity. The battery pack 1 prevents short-circuiting at the time of attachment and enables safe attachment.

By the battery cells 10 being fixed together, the battery cells 10 and the insulating sheets 50 being fixed together, and the insulating sheets 50 and restraining plates 60 being fixed together by adhesive in the battery pack 1, the resistance of the battery pack 1 to vibration or shock can be improved. For example, when the battery pack 1 is mounted in a vehicle, the relative displacement between components due to vibration, shock, or the like when the vehicle is moving can be prevented. In this way, the components inside the battery pack 1 are firmly fixed to each other to prevent damage to the internal components from vibration or shock.

The battery pack 1 has improved ease of insertion of the battery cells 10 into the first case 20 by the first case 20 including the guides 23. The battery pack 1 can have further improved ease of insertion when the tapered portions 24 are provided in the guides 23. The battery pack 1 can prevent the electrode tabs 12*p* and 12*n* from coming into contact with the inner surface of the first case 20 and deforming at the time of insertion and can reliably house the electrode tabs 12*p* and 12*n* in the housing portions 25. In particular, the formation of the tapered portions 24 causes the separation width between the guides 23 in the up-down direction to increase towards the entrance for insertion, making it easier to avoid interference between the electrode tabs 12*p* and 12*n* and the first case 20 at the time of insertion. In this way, the battery pack 1 enables safe and reliable attachment without damaging the electrode tabs 12*p* and 12*n*.

By provision of the first insulating portions 27 of the first case 20 in the battery pack 1, electrical insulation can be secured between adjacent battery cells 10 in the stacking direction. In addition to the initial state, insulation can also be maintained if the battery cells 10 swell due to deterioration over time, changing the position of the electrode tabs 12*p* and 12*n* in the up-down direction. The battery pack 1 can also achieve similar effects with the second insulating portions 37 of the second case 30.

The first case 20 and the second case 30 in the battery pack 1 are made of a resin material or a metal material provided with an electrically insulating material on the surface thereof. Electrical insulation can thereby be secured between external components, such as electrical components, and the battery cells 10 inside the battery pack 1.

The battery pack 1 is easy to assemble by virtue of the arbitrary engaging structure, in particular the combination of the engaging claws E1 and the engaging holes E2. The battery pack 1 can thereby contribute to improving product reliability.

The third outer surface 14 substantially perpendicular to the stacking direction of the battery cells 10 is restrained by the restraining plates 60 in the battery pack 1. Swelling in the stacking direction of the battery cells 10 can thereby be suppressed if an internal gas is produced during use of the battery pack 1, during charging/discharging, or by deterioration over time. When the restraining plates 60 are made of a metal material, the rigidity thereof increases, and the battery pack 1 can effectively suppress swelling of the battery cells 10. The electrical insulation in the battery pack 1 can also be further improved by forming the restraining plates 60 from a metal material coated with an electrically insulating material or a resin material, like the first case 20 and the second case 30. In this case, the restraining plates 60 can be reduced in weight, and the battery pack 1 can be manufactured at a low cost. This contributes to a reduction in weight and cost of the battery pack 1 itself.

The battery cells 10 in the battery pack 1 are restrained from both the upper and lower sides by the restraining plates 60. The battery cells 10 are therefore firmly restrained in the up-down directions. Pressure retention improves by the highly rigid restraining plates 60 sandwiching the stacked battery cells 10 both from above and below. Accordingly, the battery pack 1 can further suppress swelling in the stacking direction of the battery cells 10. Similarly, the battery pack 1 can improve support of the stacked battery cells 10. The battery pack 1 can regulate the position of each battery cell 10 in the up-down direction. As a result of the restraint in the up-down direction, the first case 20 and the second case 30 tend not to warp even when supporting the stacked battery cells 10. In other words, warping of the first case 20 and the second case 30 is regulated by the upper and lower restraining plates 60.

The battery pack 1 can suppress deterioration of the first case 20 and the second case 30 by including the openings O1 and O2. If the openings O1 and O2 were omitted, and the restraining plates 60 were provided directly on the upper surface of the first case 20 and the lower surface of the second case 30, then the restraining plates 60 would apply pressure directly on these cases, causing the cases to deform and accelerating deterioration. Accordingly, the battery pack 1 can prevent damage to the case due to such degradation over time.

By the arrangement of the insulating sheets 50, the battery pack 1 can secure electrical insulation between the restraining plates 60 and the internal battery cells 10.

The electrode tabs **12*p* and 12*n* of the battery cells 10 protrude in opposite directions in the front-back direction in the battery pack 1 and are therefore shaped symmetrically. This improves the symmetry of the first case 20. The battery pack 1 enables balanced formation of the first case 20**.

Second Embodiment

Figure 12:
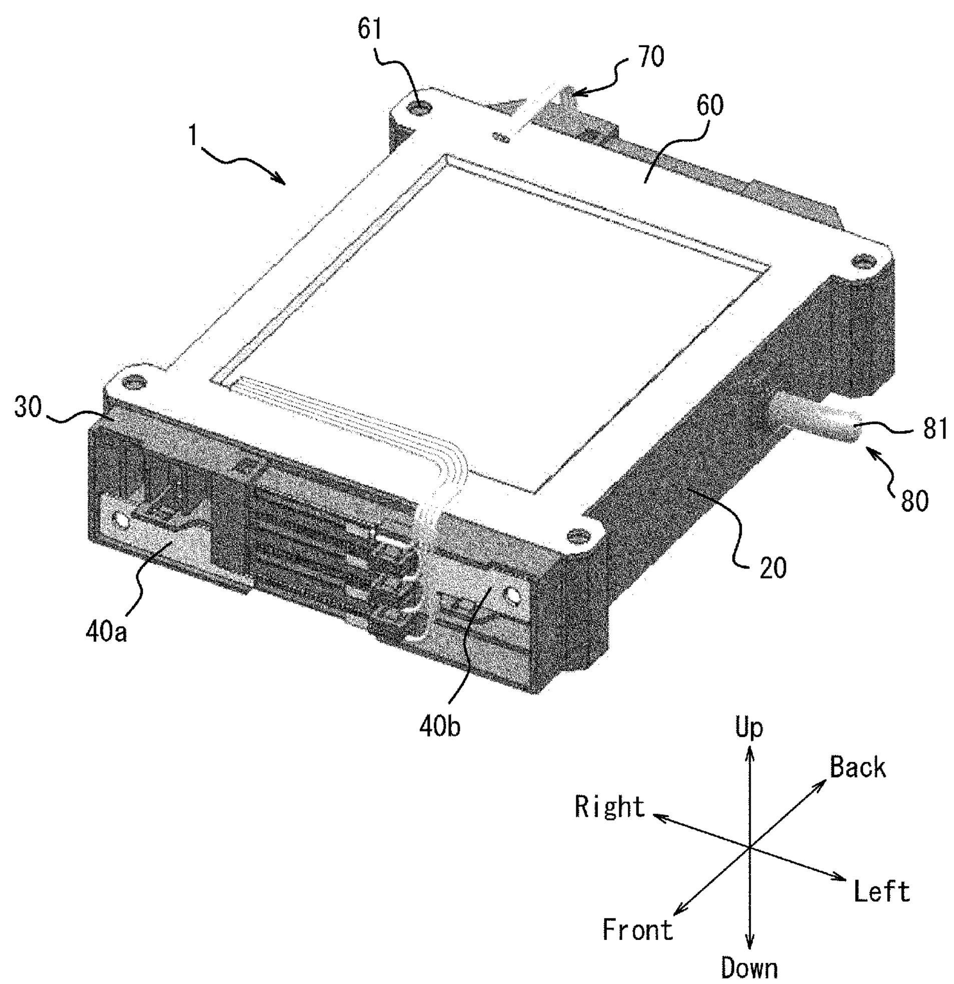
FIG. 12 is a perspective view from the top illustrating the appearance of a battery pack according to a second embodiment of the present disclosure.

FIG. 12 is a perspective view from the top illustrating the appearance of a battery pack 1 according to a second embodiment of the present disclosure. As illustrated in FIG. 12, the battery pack 1 according to the second embodiment has the configuration of the battery pack 1 according to the first embodiment, with the addition of a discharge portion 80 for discharging gas produced inside the battery cells 10 to the outside. The configuration that is the same as in the first embodiment is labeled with the same reference signs below. A description of this configuration is omitted to focus mainly on the discharge portion 80, which differs from the first embodiment.

One discharge portion 80 is provided on a side surface of the first case 20, for example. The discharge portion 80 has a discharge tube 81 extending to the outside from this side surface. The discharge portion 80 may be provided on any outer surface of the first case 20 and the second case 30, as long as internal gas can efficiently be discharged to the outside. The present embodiment is not limited to including only one discharge portion 80 and may include a plurality thereof.

Gas is produced inside the battery cells 10 along with deterioration over time. If the pressure of the internal gas exceeds a predetermined value, the internal gas is released to the outside from the surrounding edges of the battery cells 10. The discharge portion 80 guides the internal gas released from the battery cells 10 through the discharge tube 81 to the outside of the battery pack 1.

The above battery pack 1 according to the second embodiment achieves similar effects to those described in the first embodiment. Additionally, the battery pack 1 according to the second embodiment increases safety by guiding the internal gas outside through the discharge portion 80. In other words, the battery pack 1 can improve product reliability.

It will be apparent to a person of ordinary skill in the art that the present disclosure can be embodied in forms other than the above embodiment without departing from the spirit or essential features of the present disclosure. Accordingly, the description above is only a non-limiting example. The scope of the present disclosure is defined not by the description above, but by the appended claims. Among all possible modifications, the modifications within the range of equivalents are to be considered encompassed by the claims.

Figure 13:
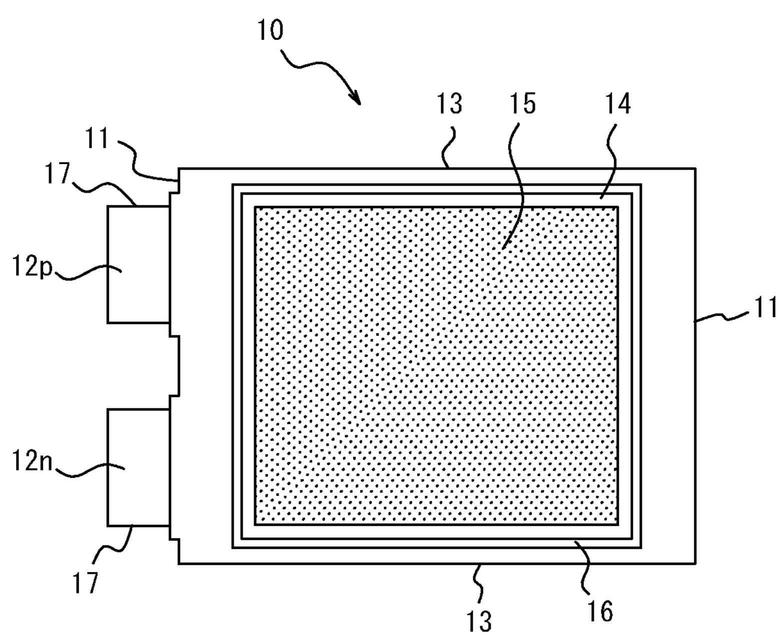
FIG. 13 illustrates only a battery cell of a battery pack according to a modification.
Figure 13:
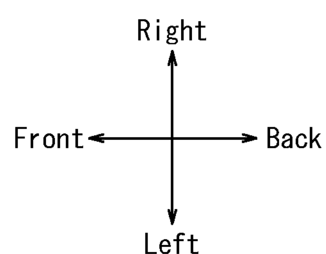

The electrode tabs **12*p* and 12*n* of the battery cells 10 have been described as protruding in opposite directions along the front-back direction but are not limited to this example. The electrode tabs 12*p* and 12*n* may be formed on the same surface. FIG. 13 illustrates only the battery cell 10 in a battery pack 1** according to a modification.

For example, as illustrated in FIG. 13, the front surface of the battery cell 10 protrudes one step farther outward in the central region of each of two halves aligned in the left-right direction than at the left and right edges. The front first outer surface 11 is formed so that two convex shapes are continuous in the left-right direction when viewed from the top. The electrode tabs **12*p* and 12*n* protrude forward from the two portions of the first outer surface 11** that protrude one step outward.

The first case 20 and the second case 30 may have any configuration that can house a stack of battery cells 10 like the one illustrated in FIG. 13. In particular, six battery cells 10 are stacked so that the positions of the electrode tabs **12*p* and 12*n* in the left-right direction differ between adjacent battery cells 10. Accordingly, the first case 20 and the second case 30 have a shape allowing six battery cells 10** stacked in this way to be housed appropriately.

For example, the housing portions 25 for housing the pairs of electrode tabs **12*p* and 12*n* can be formed together on a single outer surface, such as the front surface, in at least one of the first case 20 and the second case 30. The number of steps for assembling the battery pack 1 can thereby be reduced. The battery pack 1 can contribute to improving productivity. The electrode tabs 12*p* and 12*n* of the battery cell 10 are formed only on the front first outer surface 11, leaving the back of the battery cell 10 flat. The front to back width of the battery cell 10 thus becomes shorter by an amount equal to the electrode tab 12*p* or 12*n*. The front to back width of the case therefore also becomes shorter, and the battery pack 1** can contribute to an overall reduction in size.

The abutting portion 26 has been described as being provided only in the first case 20, but this example is not limiting. For example, the second case 30 may include an abutting portion. In this case, the abutting portion may be configured by the inner walls that correspond to the side surface 17 of the electrode tabs 12*p* and 12*n* of the battery cell 10. Both the first case 20 and the second case 30 may include an abutting portion.

The battery pack 1 need not include the tapered portions 24 as long as ease of insertion of the battery cells 10 into the first case 20 and the second case 30 can be secured.

The battery pack 1 is not limited to a configuration such that the guides 23 are independently provided. For example, the guides 23 may be omitted, and the battery pack 1 may be configured so that the first insulating portions 27 also serve as guides. In this case, the ease of insertion of the battery cells 10 can be improved by the first insulating portions 27 being provided with a tapered shape.

The number of battery cells 10, guides 23, housing portions 25, and the like are not limited to the above configurations. Any number of battery cells 10 may be included. The guides 23, housing portions 25, and the like may be provided in an appropriate form corresponding to the number of battery cells 10.

In the battery pack 1, the insulating sheet 50 and the restraining plate 60 may be provided at only one end in the up-down direction of the first case 20 and the second case 30. This can reduce the number of components and increase productivity of the battery pack 1.

REFERENCE SIGNS LIST

1 Battery pack
1*a* Body
10, 10*a*, 10*b*, 10*c*, 10*d*, 10*e*, 10*f* Battery cell
11 First outer surface
12*p*, 12*n* Electrode tab
13 Second outer surface
14 Third outer surface
15 Adhesive layer
16 Exterior member
17 Side surface
20 First case
20*a* Bottom surface
21 Screw hole
22*a* Front wall
22*b* Back wall
22*c* Side wall
23 Guide
24 Tapered portion
25 Housing portion
26 Abutting portion
26*a* Inner wall
27 First insulating portion
30 Second case
30*a* Bottom surface
31 Screw hole
32*a* Front wall
32*b* Back wall
32*c* Side wall
37 Second insulating portion
40 Bus bar
40*a* Total plus bus bar
40*b* Total minus bus bar
41*a* Insertion portion
41*b* Insertion portion
50 Insulating sheet
60 Restraining plate
61 Hole
70 Voltage detector
71 Terminal plate
Wire
80 Discharge portion
81 Discharge tube
E1 Engaging claw
E2 Engaging hole
O1, O2 Opening
S Connection surface

The invention claimed is:

1. A battery pack comprising:
a plurality of battery cells;
a first case; and
a second case, where each battery cell includes:
an electrode tab;
a first outer surface from which the electrode tab protrudes, the first outer surface facing a protruding direction of the electrode tab and extending along a first axis;
a second outer surface extending along a second axis intersecting the first axis; and
a third outer surface extending along a third axis intersecting the first axis and the second axis, the third outer surface facing a stacking direction of the battery cells, wherein:
the third outer surface comprises two surfaces facing opposite directions;
wherein the electrode tab of one battery cell among the plurality of battery cells is laser welded outside the first case to the electrode tab of another adjacent battery cell among the battery cells; and
wherein the first case and the second case are divided so as to sandwich the battery cells from a side surface of each electrode tab; and the first case including:
an insulating portion extending in the protruding direction of each electrode tab from a location facing a portion of each electrode tab to a location facing edges of the two surfaces of the third outer surface, disposed between the electrode tabs of the stacked plurality of battery cells, and configured to insulate adjacent electrode tabs in the housing portion;
a guide protruding from the insulating portion in the stacking direction of the battery cells, the guide comprising a tapered portion that tapers towards an opposite side from an insertion direction of each electrode tab; and
an abutting portion configured to abut against each electrode tab and restrict movement of each electrode tab in the insertion direction of each electrode tab while each electrode tab is inserted in the guide, wherein the guides protruding from adjacent insulating portions comprise:
a first portion protruding towards each electrode tab and configured to guide each electrode tab; and
a second portion protruding towards edges of the two surfaces of the third outer surface at a same side in the protruding direction of each electrode tab and configured to guide the edges;
wherein the first portion is separated from the second portion.

2. The battery pack of claim 1, wherein a space is formed between the first portion and the second portion.

3. The battery pack of claim 1, wherein the insulating portion extends from a location facing edges of the two surfaces of the third outer surface towards an opposite direction from the protruding direction of each electrode tab.

4. The battery pack of claim 2, wherein the insulating portion extends from a location facing edges of the two surfaces of the third outer surface towards an opposite direction from the protruding direction of each electrode tab.

* * * * *